United States Patent
Kearney

(10) Patent No.: US 6,742,924 B2
(45) Date of Patent: Jun. 1, 2004

(54) FRACTAL DEVICE FOR MIXING AND REACTOR APPLICATIONS

(75) Inventor: Michael M. Kearney, Twin Falls, ID (US)

(73) Assignee: Amalgamated Research, Inc., Twin Falls, ID (US)

(*) Notice: Subject to any disclaimer, the term of this patent is extended or adjusted under 35 U.S.C. 154(b) by 0 days.

(21) Appl. No.: 10/151,052

(22) Filed: May 17, 2002

(65) Prior Publication Data

US 2002/0196706 A1 Dec. 26, 2002

Related U.S. Application Data

(60) Provisional application No. 60/291,769, filed on May 17, 2001.

(51) Int. Cl.[7] .................................................. B01F 5/00
(52) U.S. Cl. .......................................... 366/336; 138/42
(58) Field of Search ........................... 366/173.1, 173.2, 366/174.1, 336, 337, 338, 340, 341, 349; 165/109.1; 138/37, 40, 42; 137/599, 625.28

(56) References Cited

U.S. PATENT DOCUMENTS

| | | | | |
|---|---|---|---|---|
| 1,409,259 | A | * | 3/1922 | Sykora |
| 4,198,168 | A | * | 4/1980 | Penn |
| 4,537,217 | A | | 8/1985 | Allen, Jr. |
| 4,999,102 | A | | 3/1991 | Cox et al. |
| 5,354,460 | A | | 10/1994 | Kearney et al. |
| 5,938,333 | A | | 8/1999 | Kearney et al. |
| 6,616,327 | B1 | * | 9/2003 | Kearney et al. ............ 366/340 |
| 2003/0039169 | A1 | * | 2/2003 | Ehrfeld et al. ............. 366/336 |

FOREIGN PATENT DOCUMENTS

WO     WO 99/48599     9/1999

OTHER PUBLICATIONS

International Search Report from PCT Application No. PCT/US02/16007 Filed May 17, 2002.

* cited by examiner

Primary Examiner—Charles E. Cooley
(74) Attorney, Agent, or Firm—TraskBritt

(57) ABSTRACT

Two or more independent and offset fluid transporting fractals allow the scaling and intermingling of two or more fluids separately and simultaneously prior to contacting the fluids with one another. The device provides rapid and homogeneous mixing and/or reaction.

7 Claims, 8 Drawing Sheets

FRACTAL DEVICE FOR MIXING AND REACTOR APPLICATIONS

CROSS-REFERENCE TO RELATED APPLICATION

This application claims the benefit of U.S. Provisional Application No. 60/291,769, filed May 17, 2001.

BACKGROUND OF THE INVENTION

1. Field of the Invention

The instant invention relates to mixing and reactor equipment. More specifically the invention is directed to equipment for mixing and reacting one or more fluids. The invention finds application in single as well as multi-phase environments.

2. State of the Art

Many fluid processes benefit from efficient mixing. Nearly all conventional art mixing equipment, such as blenders, impellers, static mixers, and impinging devices, scale and intermingle the fluids to be mixed while the fluids are in actual contact with one another. This approach can result in the creation of a variety of inhomogenieties within the body of the fluid mixture. Such inhomogenieties may be harmful to the process of mixing and/or the reactions occurring within the body of the fluid. For example, large scale concentration or temperature inhomogenieties may be produced within the body of the fluid mixture by the use of conventional mixing equipment.

Additionally, conventional mixing equipment generally relies upon forcing large scale turbulence upon the fluid mixture. Turbulence, in turn, may lead to the formation of eddies within the fluid body which, in many instances, may be as large as the reaction vessel itself. The presence of eddies within the fluid body may hamper the proper mixing of the fluid and further may disrupt the extent of the reactions occurring within the fluid.

Historically, slight attention has been paid in the art to the use of engineered fractal mixing as a means of processing fluids. U.S. Pat. No. 5,938,333 is one of the few examples of technical efforts in this area. In U.S. Pat. No. 5,938,333 a space filling device, which can be used for low turbulence fluid mixing in a volume, is disclosed. This device can accomplish volume mixing with very little turbulence and with a high level of homogeneity. Unfortunately, because the device of U.S. Pat. No. 5,938,333 is a space filling mixer, it is not always an appropriate processing device for a given processing requirement.

Another recent patent which describes the use of fractals to distribute or collect fluids is U.S. Pat. No. 5,354,460 which discloses a fractal fluid distribution system. PCT/US99/06245 is directed to a fractal fluid transporting device. Neither of these references disclose employing offset fractals to simultaneously and independently scale and intermingle separate fluids for mixing and/or reaction.

BRIEF SUMMARY OF THE INVENTION

The instant invention provides a method and apparatus for mixing or reacting a fluid mixture wherein one or more of the component fluids of the mixture are scaled and intermingled prior to their contacting another component fluid. Central to this method is the use of a structure which includes independent offset fluid transporting fractals. This new structure eliminates large scale eddies by scaling the entire flow of fluids through independent fractals prior to a mixing/reaction of the fluids. Furthermore, the present invention does not mix to a volume and thus the invention provides several new practical industrial opportunities for fractal mixing. This new structure scales and mixes fluid in a manner which is appropriate for flows exiting to or crossing an area (instead of a volume) and is not a space filling fractal configuration. We have discovered a number of useful applications which can use this different approach. An important example is the use of this device via attachment to a flow-through pipe. This allows simple but efficient pipe flow oriented fluid mixing and reaction. Using the structure in this manner is beneficial because it allows easy incorporation into existing processing technology. Another industrially useful application is attaching the device to the side of a vessel so that fluids are mixed homogeneously just prior to entering the vessel. Still another useful application is the provision of a surface of homogeneously mixed gases for subsequent combustion applications.

The instant invention is particularly applicable to providing rapid and homogeneous mixing, with or without a reaction occurring between the fluids. The invention can also provide controlled mixing and heat transfer simultaneously, for example in order to control the temperature of a reaction process. Contemplated uses of the invention include the following:

1. Mixing two or more fluids rapidly.
2. Mixing two or more fluids while controlling temperature.
3. Mixing and reacting two or more fluids.
4. Mixing and reacting two or more fluids while controlling temperature.
5. Mixing two or more fluids to allow subsequent homogeneous reaction outside the device.

Further environments wherein the invention may find application include the following:

1. Liquid-liquid mixers.
2. Gas-gas mixers.
3. Gas-liquid mixers.
4. Liquid-liquid reactors.
5. Gas-liquid reactors.
6. Gas-gas reactors.
7. Aerators.
8. Carbonators.
9. Fluid mixing prior to combustion.

By using the instant invention, two or more fluids can be rapidly mixed in a homogeneous manner without using mechanical mixing equipment. Turbulence inducing mechanical mixing devices, such as impellers, blenders, impinging devices, etc. are not used. Therefore large scale mixing inhomogeneities can be avoided. Large scale eddies in mixing processes can reduce the yield of chemical reactions. This device eliminates large scale eddies from the mixing process. Avoiding mechanical mixing can also reduce the amount of energy used. Ordinary mixing processes most commonly result in energy wasted because the large scale turbulence which is forced on the mixing process must eventually be dissipated as heat. The device in this invention does not form large scale turbulence or eddies so large scale motion is not dissipated as wasted energy.

The distribution of fluid properties can be controlled in a beneficial manner using the invention. For example, for a gas mixing with a liquid, the gas bubble size distribution can be controlled and at the same time the liquid is also scaled, therefore mass transfer characteristics are more controlled. Other fluid property distributions which can be controlled by this device include fluid velocities, temperature, concentration and eddy size.

Because fluid property distributions can be more controlled compared with conventional mixing/reactor equipment, the equipment can be smaller and more efficient. If desired, the mixing can be rapid and homogeneous but with very gentle treatment of the fluids. The various embodiments of the invention can be used as elements in conventional processing. For example, as a rapid mixer in an ordinary pipeline or as an multi-fluid mixer entering a tank or other vessel.

Unlike nearly all fluid reactors, the various components to be mixed and reacted can all be scaled and intermingled with one another prior to contact with one another. This results in a more rapid and homogeneous reaction. Side reactions caused by large scale inhomogenieties can be avoided. Furthermore, mixing and reaction temperature can easily be controlled. Large mixing or reactor tanks can be completely eliminated since all the fluids to be mixed and/or reacted can be scaled and intermingled together in this device.

DETAILED DESCRIPTION OF THE INVENTION

Figure 1:
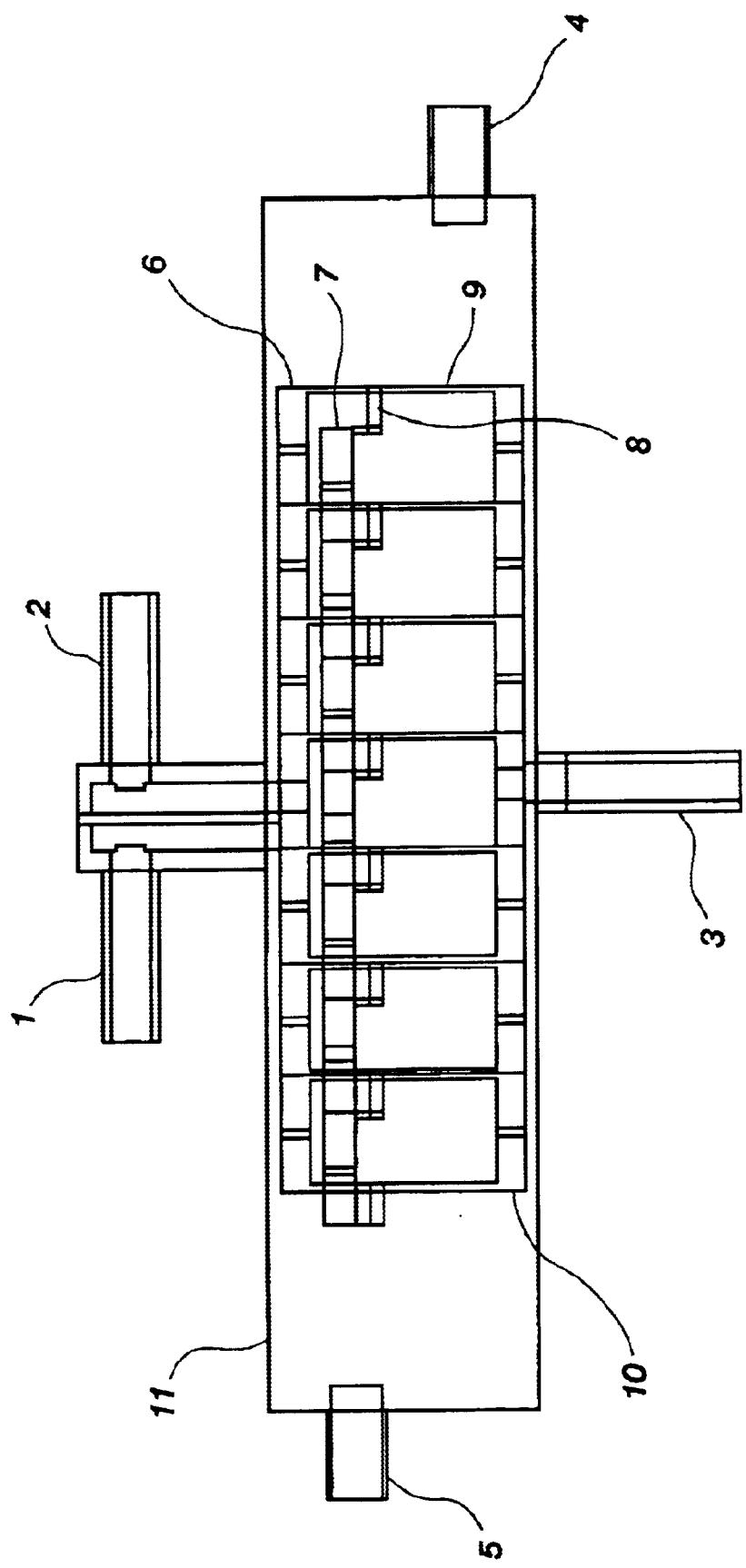
FIG. 1 is a cross sectional view of an offset fractal structure of the invention.

FIG. 1 illustrates an embodiment of a fractal structure which in addition to the offset fractal characteristic of this invention also includes merging and contact channels, a fractal collector and a heat exchange enclosure. This embodiment is useful as a processing (mixing and/or reaction element in pipe configurations. Flow input channels 1 and 2 are for the separate fluids which will be mixed. Additional inputs can be added if more than two fluids are to be mixed. Input 1 provides flow to offset fractal distributor 7 while input 2 provides flow to offset fractal distributor 6. The fluid flows are scaled and distributed through these offset fractals.

After independent fractal scaling of the fluids, the two input flows contact one merging channels 8 and proceed in a mixed condition through channels 9. In the channels 9, hereinafter denominated "contact channels," the fluids are finally brought into contact one with another. The flows in contact channels 9 are re-scaled to a single flow through fractal collector 10 and exit channel 3. The enclosure 11 is used if temperature control is required for mixing or reaction or if an enclosure is needed for flanging or other attachment. In the case of temperature control, a heat exchange fluid is typically passed from conduit 4 to the inside volume of the mixer for heat exchange with the internal conduit and out conduit 5. In the case of using the enclosure as an attachment structure, enclosure 11 can be a solid material surrounding the internal channels. For example, enclosure 11 can be used as a simple flange for attachment to a pipe flange.

Figure 2:
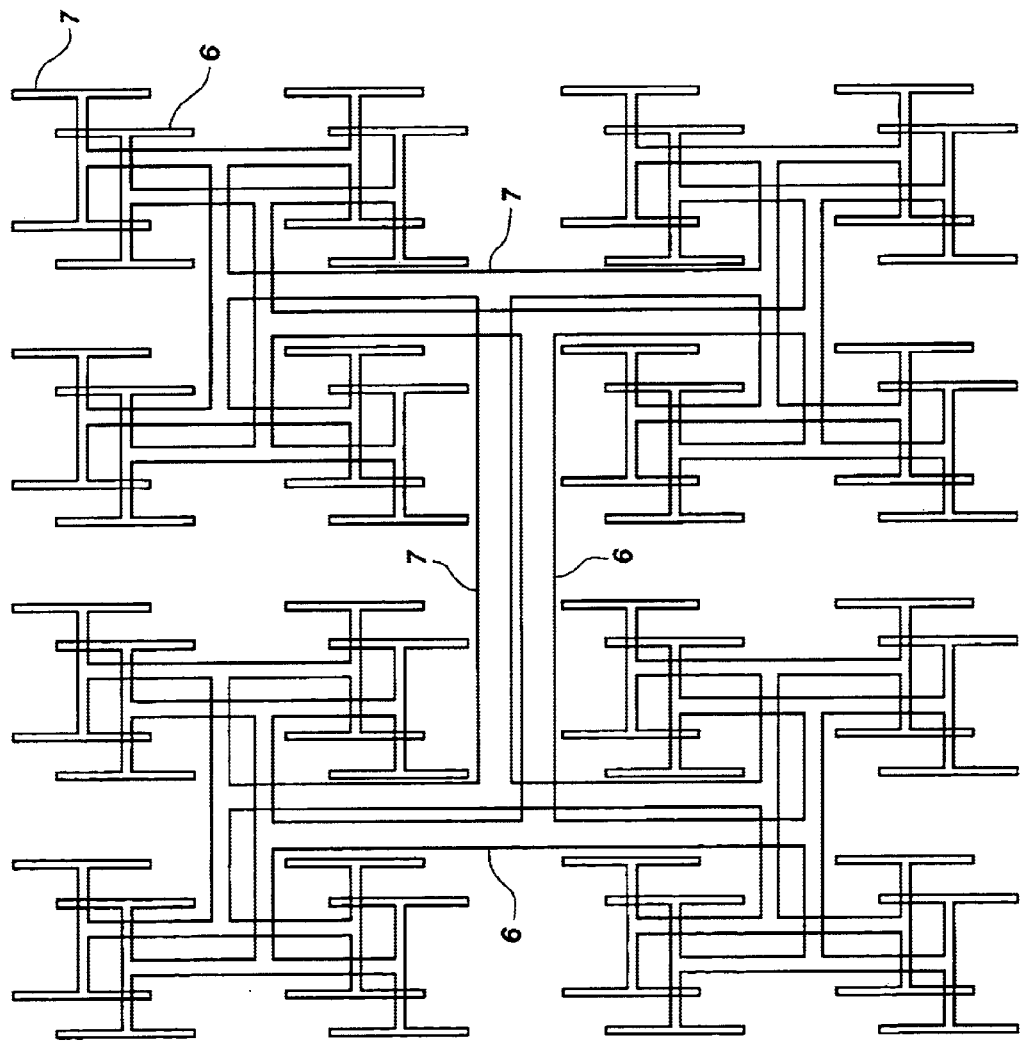
FIG. 2 is a plan view of two fractal distributors illustrated in an offset orientation.
Figure 3:
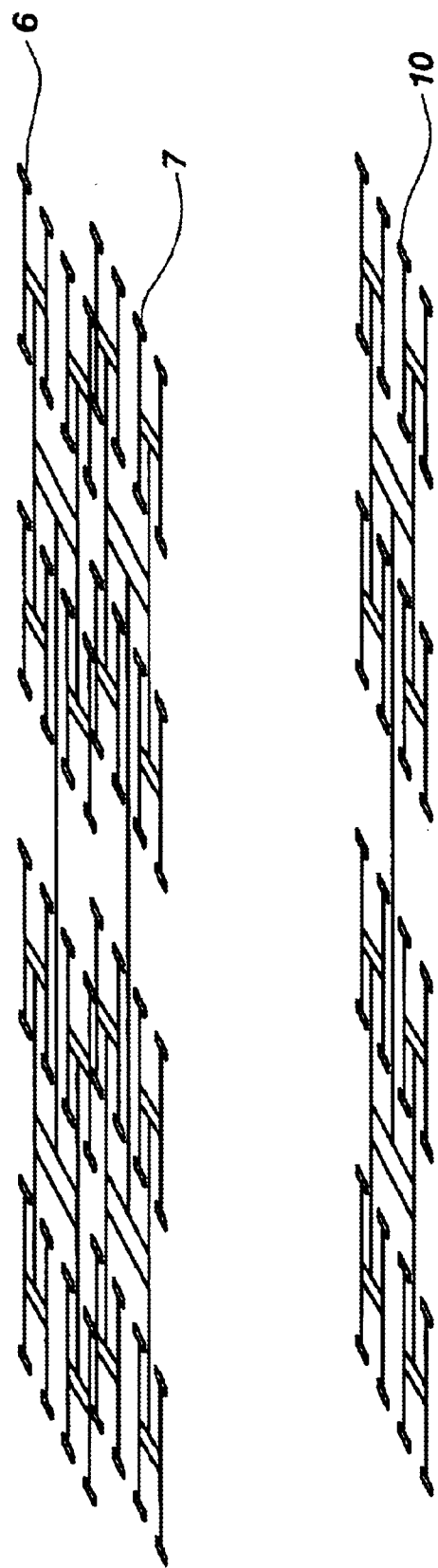
FIG. 3 is a perspective view of the two fractal distributors of FIG. 2 in association with a collector.

FIG. 2 illustrates the offset of fractal distributors 6 and 7. The fractal distributors not intersect because they are set on different planes, as shown in FIG. 3. Note that the flows through fractals 6 and 7 are independent and cannot contact one another until after they exit fractals 6 and 7. If more than two fluids are mixed, additional independent offset fractals can be used.

If more than two fluids are mixed or reacted by these devices, all can be merged simultaneously or they can be progressively mixed. This can easily be accomplished by placing merging channels at different positions along the length of the device. An example of such a use would be when two fluids must first be mixed or reacted before mixing or reacting with a third fluid. The third fluid would merge at an appropriate distance downstream from the merging of the first two fluids.

For purposes of illustration, each input conduit is shown scaled to 64 smaller conduits. However it is a basic characteristic of this device that the fractal conduits can be progressively bifurcated to smaller and more numerous paths until restrictions on manufacturing are reached. It is recognized that increasing the number of bifurcations will provide a progressively improved homogeneity of mixing and reaction. Because each independent distribution fractal (6 and 7) in these figures bifurcates to 64 flow paths, there are 128 total distribution channels prior to merging and these merge to form 64 contact channels (9). FIG. 3 illustrates the approximate location of fractal collector 10.

Because this invention uses fractals for the offset structures, those skilled in the art will recognize that this provides an inherent geometric variability which adds to the practical value of this invention. One reason variable geometry may be desired for the fractals is that the device may require a geometry constrained by the corresponding geometry of an enclosure it is contained in or a receiving device it exits into. Another reason for variable geometry is to provide the artisan with control over hydraulic characteristics such as pressure drop.

Fractals are constructed using an initiator structure, or parent structure, with self similar structure added at smaller and smaller scales. The initiator in the illustrated embodiment is in the form of an "H" and as a result, four new child structures are added to each "H" as smaller scale structure is added. It is well known in the art that fractals can be constructed using variations in the initiator geometry, number of branches, branch angles and in the amount of initiator symmetry. Just as an example, the initiator could be a symmetric "Y" having one leg longer that the other two.

Another way to vary the device geometry is by altering the child structures. The child structures need not exhibit scaled-down geometry identical to the initiator. This type of variation can include the geometry or symmetry of the child structures at each iteration, for example by using variable scaling factors for determining child structure dimensions and channel diameters.

We note that the number of generations of child structure can be varied as desired (the number of fractal iterations) to obtain a desired level of scaling prior to mixing/reaction or to meet practical requirements such as the avoidance of device plugging.

The offset fractals need not be identical. As an example, if three offset fractals are used to mix or react three materials, two of the fractals could of an identical geometry while a third is not, or all three could be of different geometry. The reason for this is that the materials to be treated may have variable characteristics which would suggest to a person skilled in the art to use different geometries. For example, the flow rate through one fractal may be very high compared with a second so that pressure drop may be best controlled by using differing channel cross sectional area or number of fractal iterations through each individual fractal.

Figure 4:
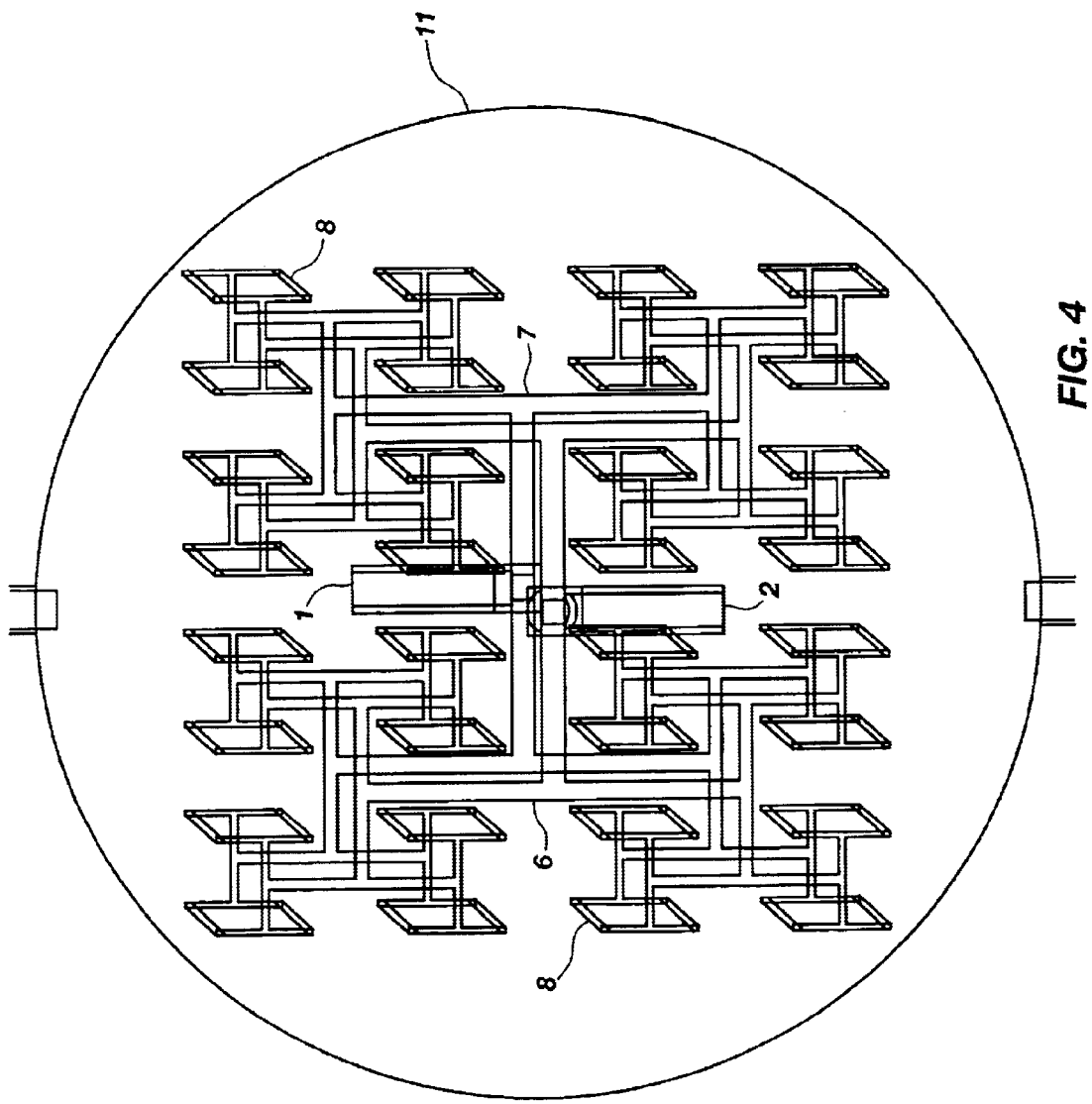
FIG. 4 is a top view of a fractal structure in association with a pipe element.
Figure 5:
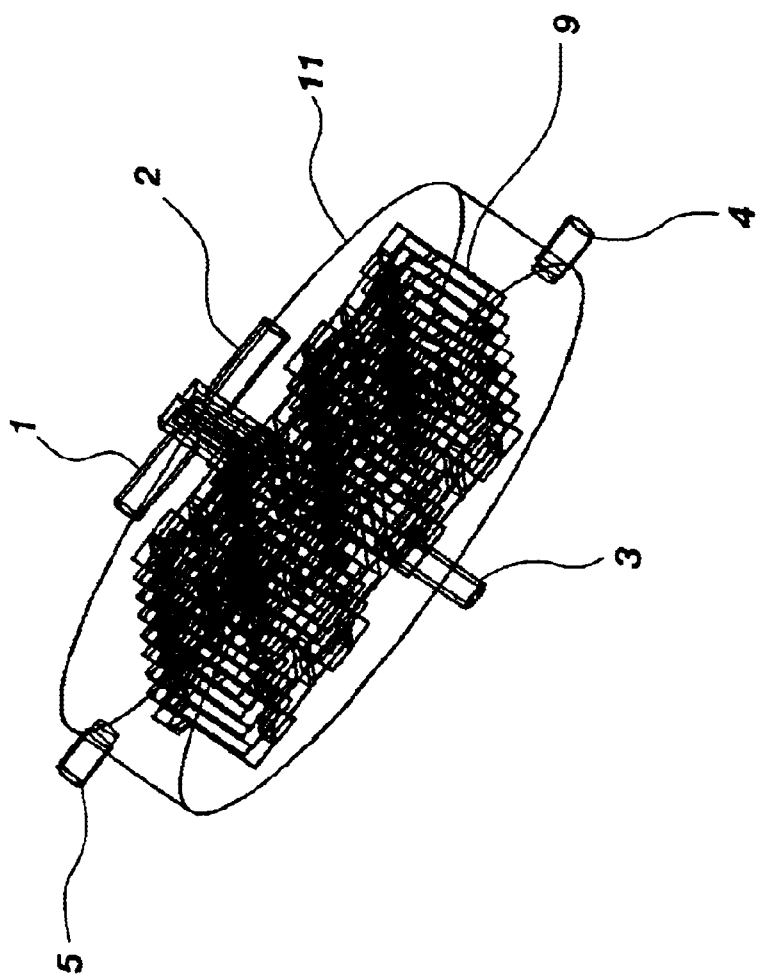
FIG. 5 is a perspective view of the fractal structure of FIG. 5.
Figure 6:
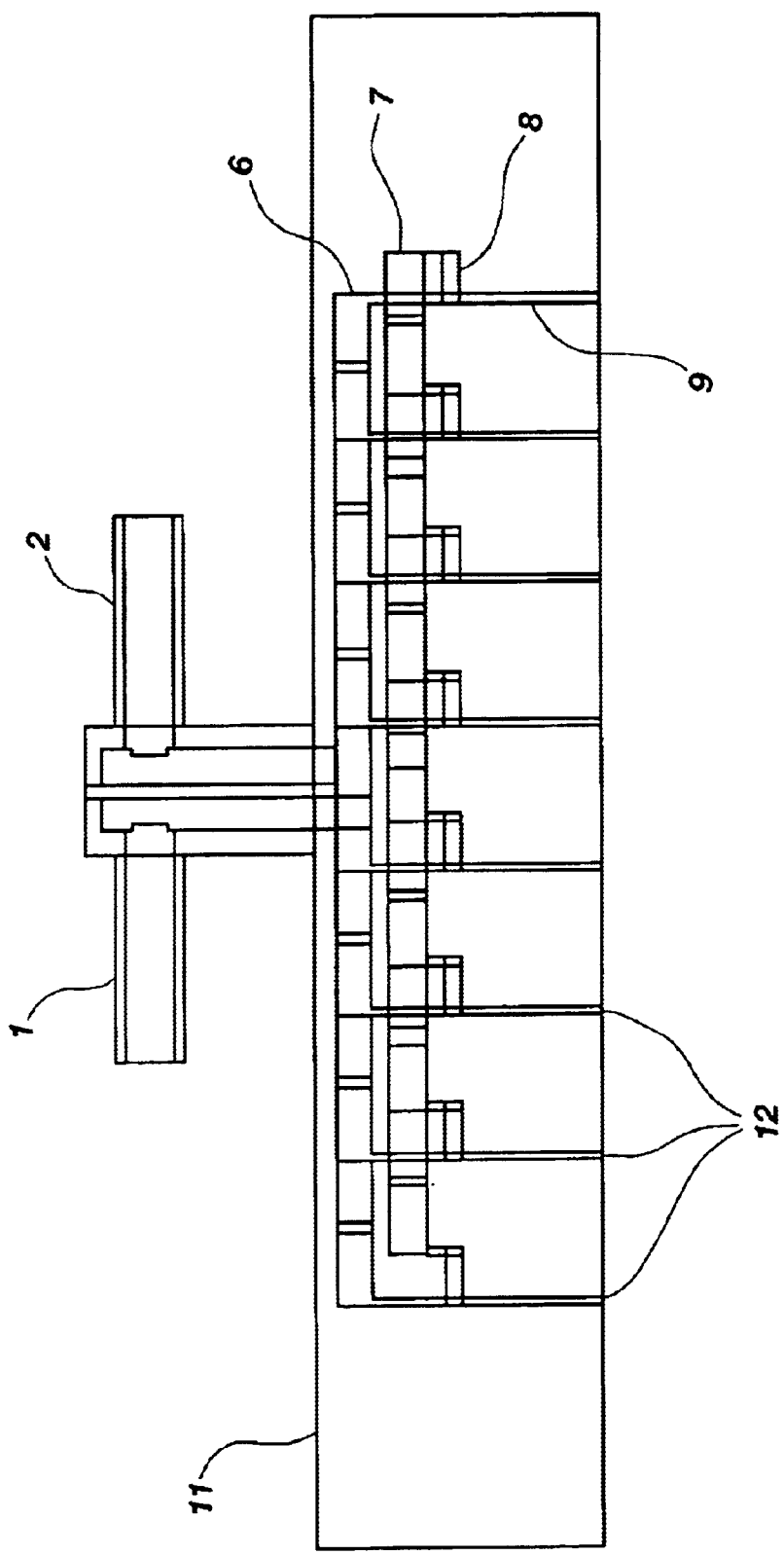
FIG. 6 is a cross sectional view of an alternative embodiment of the fractal structure.

FIG. 4 is a top view and FIG. 5 is an isometric view of the pipe element embodiment. While this embodiment is useful when the flow from the mixing or reactor process should be re-collected into a single flow, the device can be used to advantage without the collector. This can be useful, for example, when mixing air and gas for a combustion application or for injecting the mixture into the side of a tank or other vessel. FIG. 6 illustrates an embodiment without re-collection. In this case the fluids from inputs 1 and 2 are scaled and distributed in the same manner as described earlier but the flows are not re-collected into one flow, i.e., output channel 3 and fractal collector 10 have been removed. In this embodiment the large number of contact channels 9 exit the device independently at contact channel exits 12. Because the rest of the device is the same as described earlier, in this example there will be 64 such exits.

Figure 7:
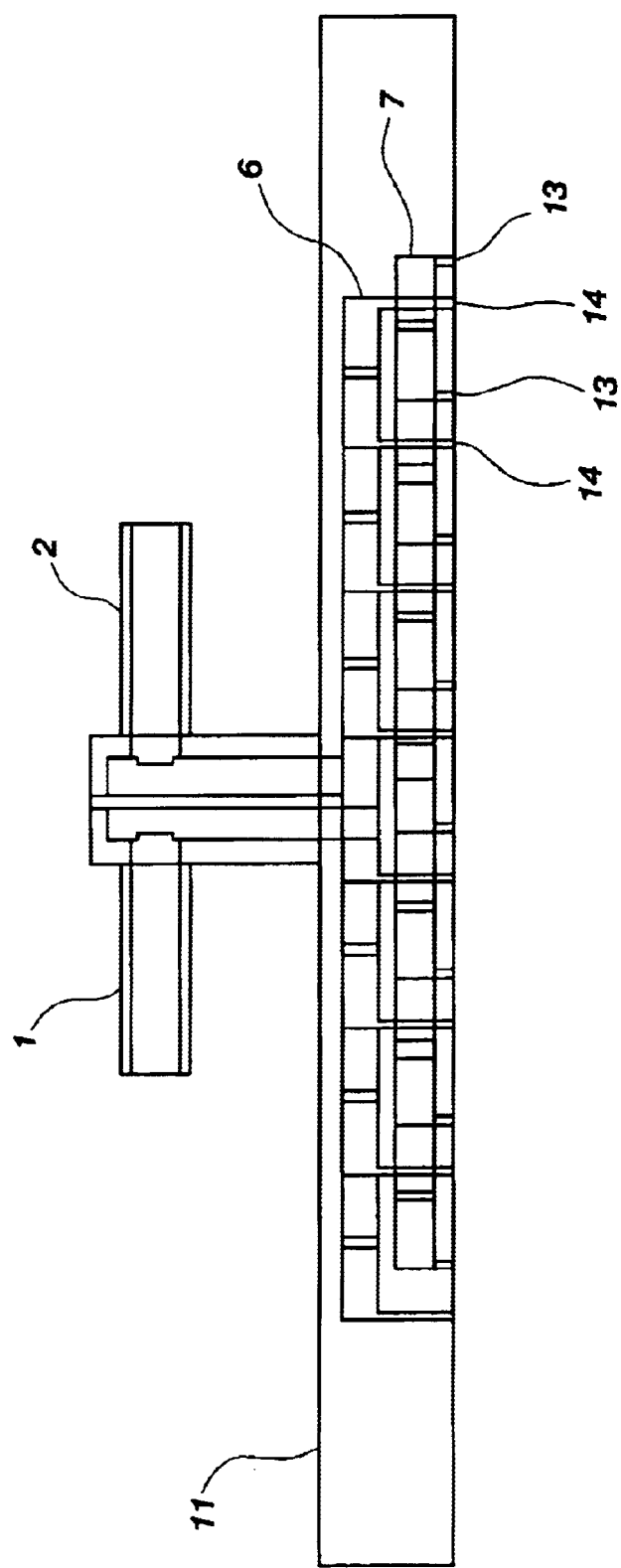
FIG. 7 is a cross sectional view of a further alternative embodiment of the fractal structure.
Figure 8:
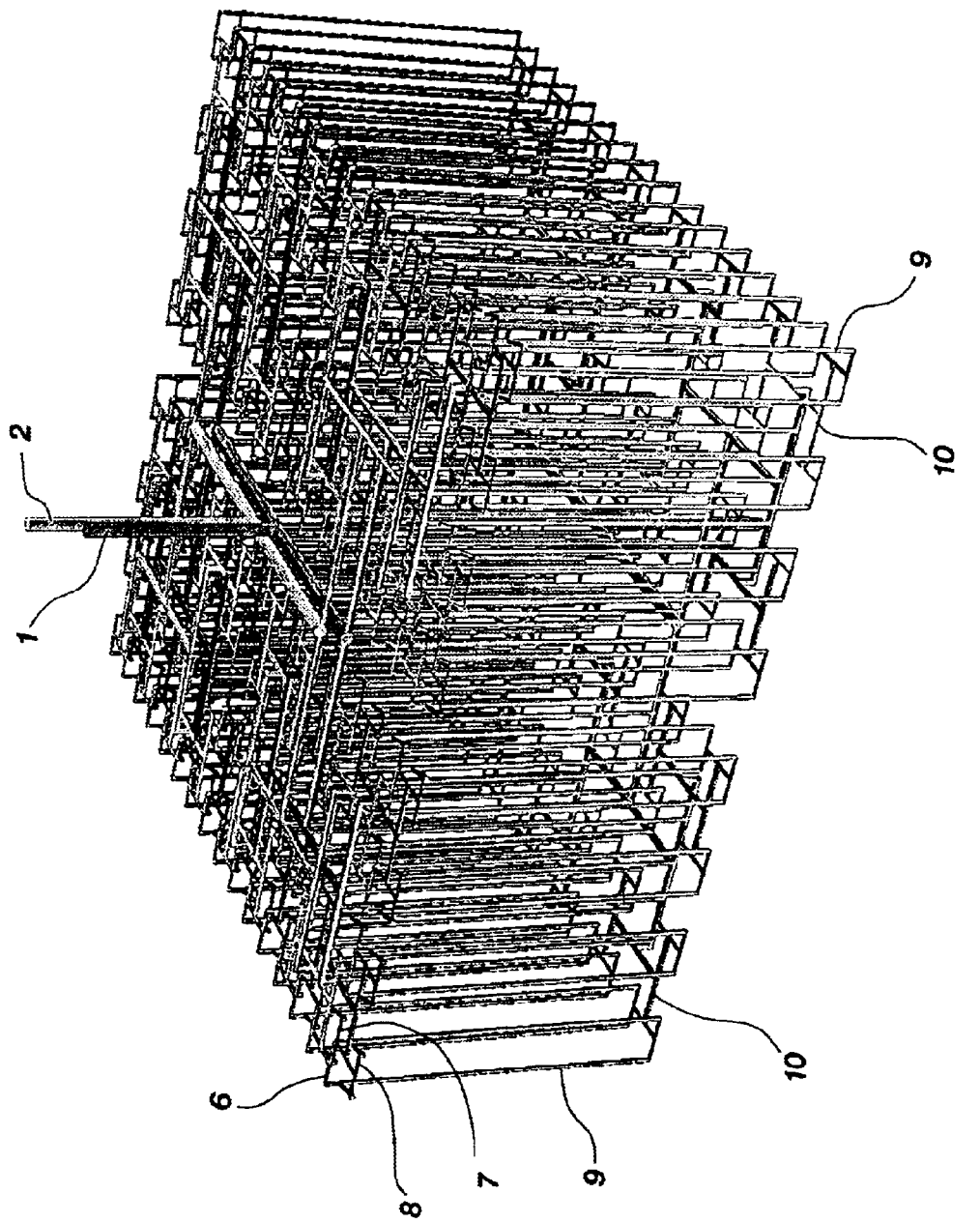
FIG. 8 is a perspective view of yet another alternative embodiment of the fractal structure wherein the structure is not enclosed within a containment vessel.

It is also possible to eliminate the merging channels 8 and mixing channels 9 so that the scaled and intermingled flows exit the device prior to contact with one another. FIG. 7 illustrates this minimal configuration for the invention and consists of the flow inputs 1 and 2, and the offset fractals 6 and 7. Fractal 7 exits through outlets 13 and fractal 6 exits through outlets 14.

For these last two embodiments, the enclosure (11) is again optional but can be useful for either heat exchange or for attaching or flanging the device to a vessel.

We note that the area that the offset fractals exit into need not be a plane. The fractals can exit to a curved or irregular surface. This can be useful, for example, if the target vessel has a curved or irregular shape. In such a case, it can be useful to match the curved surface of the vessel with a complementary curve on the exit surface of the mixing device.

The figures show the offset fractals bifurcated perpendicular to the large scale inlet and outlet flow direction. It is possible to bifurcate the fractals at any angle from perpendicular to nearly parallel to these flow directions. Configuring at angles which are not perpendicular to the large scale flow can have advantages as well as disadvantages. One advantage of using fractal bifurcations more in-line with the flow direction is that it may be possible to operate the device with less pressure drop since flow momentum will not be forced to make as drastic a change in direction as the bifurcations are carried out. A disadvantage can be that the device will become longer in the direction of the flow and perhaps less compact. It is therefore a user decision which advantages are most important for a given process and from these considerations chose the appropriate bifurcation angles.

This invention uses two or more offset fractals which independently scale fluids before they contact one another. The method of offset scaling can be different than in the figures. For example, the separate fractals can be contained within one another. A smaller conduit carrying one fluid can be placed inside a second larger conduit. A second fluid can therefore flow between the inner surface of the larger conduit and the outer surface of the smaller inner conduit. The two conduits can progressively be bifurcated to smaller and smaller scale until a desired exit size is reached. As with the above embodiments, the flows can be merged, in this case by simply ending the inner conduit so that the inner flow contacts the outer flow. The merged flows can also be collected and further merged into a single flow, if desired, as described earlier. Note that we are defining "offset" to include smaller conduit inside of larger conduit since the flows are properly kept offset from one another by this optional method.

This method of offsetting fractal conduits within one another can be extended to any number of separate fluids by adding a separate enclosed conduit for each fluid.

We note that in the event of operation with fluctuating pressures between the independent flows or in the event that a particular flow is temporally shut off it can be useful to have check valves on channels to avoid backflow of one fluid through the distribution fractal of a different fluid.

This invention can be applied over the entire range of fluid processing scales from very small scale applications to very large scale industrial use. The reason for this is that the fractal structures used in this invention provide a continuing scaling function as application scale changes. This wide range of applicability is one of the inherent advantages of this mixer design.

Because this device is used for mixing and/or reaction of fluids, the resulting products can be used as desired in subsequent processing equipment.

It is noted that a particular manufacturing technique is not required to realize this invention. Computer aided machining, stereolithography, photochemical etching, laser cutting, molding, micro-machining, nanotechnology, ion deposition and conduit construction techniques are a few appropriate methods for building these devices.

It is recognized that future manufacturing techniques which may improve the ability to construct small scale structure will also be useful for construction of these devices.

What is claimed is:

1. A structure for mixing at least two fluids, said structure comprising: at least two fluid transporting fractals, namely a first fluid transporting fractal and a second fluid transporting fractal, each said fluid transporting fractal having a respective fluid input which bifurcates to a plurality of fluid outputs, said fluid transporting fractals being positioned offset from one another, each said fluid transporting fractal being configured to facilitate a flow therethrough independent from a flow in said other fluid transporting fractal, a first said output of said first fluid transporting fractal being interconnected to a respective second output of said second fluid transporting fractal by a merging channel, said merging channel providing a zone, isolated from fluid flows from outputs other than from said first and second outputs, wherein fluid exiting said first output of said first fluid transporting fractal may mix with fluid exiting said second output of said second fluid transporting fractal in an environment isolated from fluids exiting said outputs other than said first and second outputs.

2. The structure of claim 1 further including a plurality of merging channels, wherein each merging channel interconnects with a respective said output of said first fluid transporting fractal and a respective said output of said second fluid transporting fractal.

3. The structure of claim 2 wherein the said plurality of merging channels are interconnected one to another to define a single exit flow channel.

4. The structure of claim 3 wherein the said interconnection to form a single flow is accomplished by using a fractal arrangement wherein the direction of flow is from the small scale end of the fractal arrangement to the large scale end of the fractal arrangement.

5. The structure of claim 1 further including an enclosure, wherein at least some portion of one or more of said fluid transporting fractals is disposed within said enclosure such that a heat exchange fluid resident within said enclosure can pass over the outside surface of the enclosed fluid transporting fractals.

6. The structure of claim 1 further including an enclosure wherein at least some portion of one or more of said fluid transporting fractals is disposed within said enclosure such that the enclosure can be used for attaching the structure to a support structure.

7. The structure of claim 1 wherein each said merging channel is associated with a contact channel for directing fluid from said merging channel to a single exit outlet of said structure.

\* \* \* \* \*